(12) United States Patent
Steiner

(10) Patent No.: US 11,712,128 B2
(45) Date of Patent: Aug. 1, 2023

(54) MILK MODULE FOR GENERATING MILK FOAM OR MILK BEVERAGES, PREFERABLY FOR INSTALLING INTO A COFFEE MACHINE

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 681 days.

(21) Appl. No.: 16/627,896

(22) PCT Filed: Jun. 8, 2018

(86) PCT No.: PCT/EP2018/065123
§ 371 (c)(1),
(2) Date: Dec. 31, 2019

(87) PCT Pub. No.: WO2019/007629
PCT Pub. Date: Jan. 10, 2019

(65) Prior Publication Data
US 2020/0121120 A1    Apr. 23, 2020

(30) Foreign Application Priority Data

Jul. 6, 2017  (CH) ................................ 00875/2017

(51) Int. Cl.
| A47J 31/44 | (2006.01) |
| A47J 31/60 | (2006.01) |
| A47J 31/46 | (2006.01) |

(52) U.S. Cl.
CPC ......... *A47J 31/4485* (2013.01); *A47J 31/469* (2018.08); *A47J 31/60* (2013.01)

(58) Field of Classification Search
CPC .. A47J 31/4485; A47J 31/4489; A47J 31/469; A47J 31/60
See application file for complete search history.

(56) References Cited

U.S. PATENT DOCUMENTS 5,498,757 A * 3/1996 Johnson .................. A47J 31/54
99/323.1
5,957,033 A * 9/1999 In-Albon ............ A47J 31/4403
99/290

(Continued)

FOREIGN PATENT DOCUMENTS

| CN | 203802281 U | 9/2014 |
| JP | H1146981 A | 2/1999 |

(Continued)

OTHER PUBLICATIONS

Notice of Reasons for Refusal for Japanese Patent Application No. 2019-572189 dated Dec. 20, 2022.

*Primary Examiner* — Helena Kosanovic
*Assistant Examiner* — Lawrence H Samuels
(74) *Attorney, Agent, or Firm* — Brian Roffe

(57) ABSTRACT

Milk module for generating milk foam or milk beverages, preferably for installing into a coffee machine, is designed as an independent unit. The milk module includes a cooling chamber connected to a cooling assembly for receiving a milk container, a conveyor pump, a steam generating device, a device for heating milk or generating the milk foam, and a connection system. The heated milk or generated milk foam is conveyed through a discharge line to the coffee outlet in the coffee machine by the connection system. A cleaning container with a cleaning agent can be positioned into the cooling chamber instead of the milk container. A suction tube is mounted in the refrigerated box in a pivotal manner, which hangs freely at the bottom, and which in the forwards-pivoted position can be contactlessly inserted into the milk container or the cleaning container from the top when being installed.

20 Claims, 3 Drawing Sheets

(56) References Cited

U.S. PATENT DOCUMENTS

| | | | |
|---|---|---|---|
| 7,252,034 B1* | 8/2007 | Eckenhausen | A47J 31/4485 99/323.1 |
| 7,258,062 B2* | 8/2007 | Green | A47J 43/12 99/323.1 |
| 7,322,282 B2 | 1/2008 | Frigeri | |
| 8,444,016 B2* | 5/2013 | Lussi | A47J 31/402 222/145.2 |
| 8,770,099 B2* | 7/2014 | Reyhanloo | A47J 31/60 134/25.4 |
| 10,568,454 B2* | 2/2020 | Balkau | A47J 31/4489 |
| 2004/0009281 A1 | 1/2004 | Green | |
| 2007/0031558 A1* | 2/2007 | Lussi | A47J 31/468 426/520 |
| 2007/0048428 A1 | 3/2007 | Green | |
| 2007/0240582 A1* | 10/2007 | Eimer | A47J 31/4485 99/323.3 |
| 2010/0187259 A1* | 7/2010 | Lussi | A47J 31/402 222/129.4 |
| 2011/0005407 A1* | 1/2011 | Reyhanloo | A47J 31/4485 134/22.12 |
| 2011/0311694 A1 | 12/2011 | Weggis | |
| 2013/0019903 A1 | 1/2013 | Rizzuto et al. | |
| 2014/0116475 A1 | 5/2014 | Steiner | |
| 2015/0182062 A1 | 7/2015 | Rizzuto et al. | |
| 2015/0182066 A1 | 7/2015 | Rizzuto et al. | |
| 2015/0327715 A1 | 11/2015 | Steiner | |
| 2015/0335196 A1 | 11/2015 | Beaudet et al. | |
| 2017/0164644 A1 | 6/2017 | Steiner | |
| 2017/0208990 A1 | 7/2017 | Turi et al. | |
| 2017/0303734 A1* | 10/2017 | Balkau | A47J 31/4485 |
| 2018/0098659 A1 | 4/2018 | Steiner | |
| 2019/0008313 A1 | 1/2019 | Steiner | |
| 2019/0008314 A1 | 1/2019 | Steiner | |
| 2020/0205606 A1 | 7/2020 | Rizzuto et al. | |
| 2021/0196076 A1 | 7/2021 | Rizzuto et al. | |

FOREIGN PATENT DOCUMENTS

| | | |
|---|---|---|
| JP | 2002320551 A | 11/2002 |
| JP | 2004174093 A | 6/2004 |
| WO | 2019007629 A1 | 1/2019 |

\* cited by examiner

MILK MODULE FOR GENERATING MILK FOAM OR MILK BEVERAGES, PREFERABLY FOR INSTALLING INTO A COFFEE MACHINE

FIELD OF THE INVENTION

The invention relates to a milk module for generating milk foam or milk beverages, preferably for installing into a coffee machine, with a milk container, a conveyor pump and a device for heating milk or for generating the milk foam or other milk beverages.

BACKGROUND OF THE INVENTION

Coffee machines with integrated modules for generating milk foam or heating milk are, as is well-known, installed in various implementations. They make possible the automatic generation both of coffee, such as espresso, and also mixed beverages made of coffee and milk or milk foam, in particular cappuccino.

Coffee machines are conventionally provided with a cleaning device which automatically effects periodic cleaning of the machine during operation. In compact coffee machines, it is difficult for structural design to provide such a cleaning device, because limits are placed on spatial requirement.

OBJECTS AND SUMMARY OF THE INVENTION

The object of the invention is to avoid these disadvantages and produce a coffee machine of the type named at the outset which, with a simple design and easy handling, can carry out the above-named functions with the most reduced spatial requirement possible.

This object is achieved, according to the invention, by a milk module designed as an independent unit which includes a cooling chamber connected to a cooling assembly for receiving a milk container, a conveyor pump, a device for generating steam, a device for heating milk or for generating the milk foam, as well as connection means, by which the heated milk or the generated milk foam can be conveyed through at least one discharge line to a coffee outlet in a coffee machine. This object is also achieved by a cleaning system integrated in a milk module designed as an independent unit, by means of which module a cleaning process is made possible in particular by a conveyor pump, a device for heating or for generating the milk foam as well as an input or output line, and for this purpose, instead of the milk container, a cleaning container with a cleaning agent can be inserted into the cooling chamber.

Due to the design according to the invention of the milk module as an independent unit, with this connection means provided preferably as a socket attachment, it can be mounted simply in a coffee machine housing and the milk outlet effected in the coffee outlet.

A considerable saving of space can be achieved using the design according to the invention because, after removing the milk container from the cool box, the installation space required by this, for housing the cleaning container, is made available, with the result that there is no further spatial requirement for the latter.

The invention also provides that the milk container or the cleaning container is provided on the working circuit of the machine by means of a suction hose in the upper region of the cool box housed pivotable forwards or backwards, and hanging freely downwards. The capacity to swivel the suction hose makes possible the independent introduction or removal of same from the container without the operator needing to touch it during the changeover procedure.

Very advantageously, according to the invention, the cleaning container contains a device with a water supply channel, a defined opening for receiving a cleaning agent and an outlet opening. Water can thus be guided through this supply channel into this opening and the cleaning agent dissolved therein, emulsified with the water and the cleaning container can thus be filled. This makes possible simple handling for cleaning and precise metering of the cleaning agent, wherein in particular cleaning tablets are intended to be used for this purpose.

BRIEF DESCRIPTION OF THE DRAWINGS

The invention is explained in more detail below using an embodiment example, with reference to the drawings. These show, in.

DETAILED DESCRIPTION OF THE INVENTION

Figure 1:
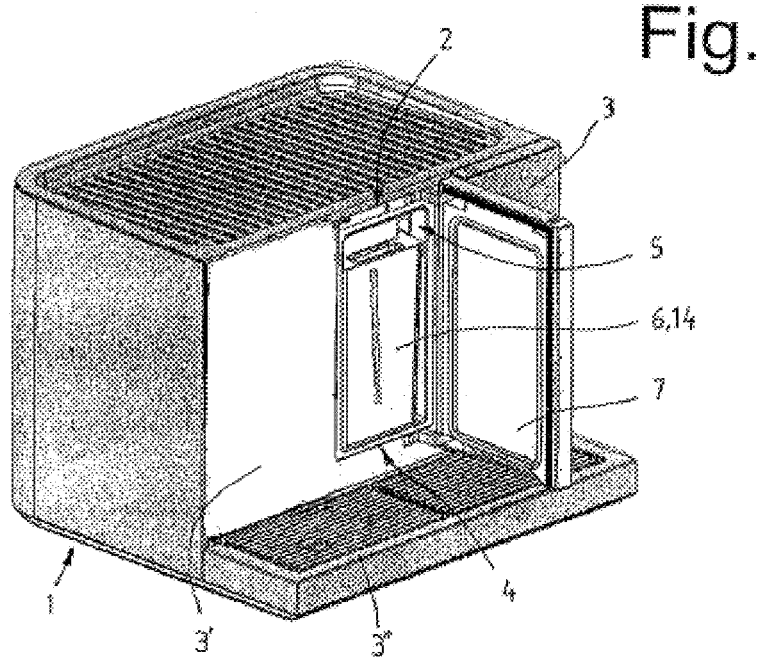
FIG. 1 shows a coffee machine with the milk module represented in perspective view, wherein the coffee module is not shown.

The coffee machine 1 shown in FIG. 1 with a housing 3 serves to generate coffee or coffee-containing beverages, as well as mixed beverages made of coffee with milk or milk foam, automatically. It consists of a coffee module for generating coffee, of which only the openings 3' in the housing 3 for installing same are shown, and a milk module 2 for preparing milk or milk foam, which can be installed, independently of one another, next to one another in the common housing 3, in space-saving manner. The coffee module 1 consists per se of conventional components and is not explained in more detail. Solely a drip pan 3" is shown at the front side in the housing 3, on which pan a cup or the like can be placed for pouring in coffee and/or milk or milk foam.

The milk module 2 which can be installed in the housing 3 is equipped with a cool box 4, the cooling chamber 5 of which can receive a milk container 6. The cooling chamber 5 which optionally can be locked can be accessed easily by a cabinet door 7 arranged on the front side of the machine. Thereby, after opening this cabinet door 7, the milk container 6 can be inserted into the cooling chamber 5 of the cool box 4 or removed therefrom. The cooling chamber 5 is designed such that the milk container 6 fits approximately play-free therein.

Figure 2:
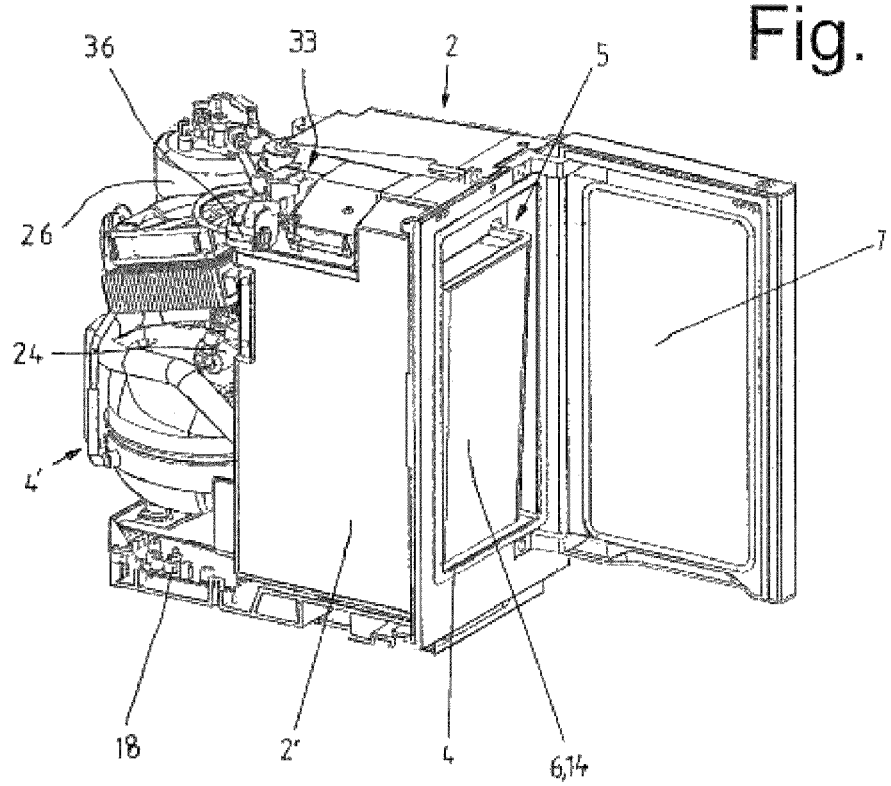
FIG. 2 is a perspective side view of the milk module according to FIG. 1.

As can be seen from FIG. 2, the milk module 2 according to the invention is designed as an independent unit which comprises a cooling chamber 5, connected to a cooling assembly 4', for receiving the milk container 6, a conveyor pump, a boiler 26 for generating the steam, a device 24 for heating or for generating the milk foam, as well as a connection means, by which the heated milk or the generated milk foam can be conveyed through a line to the coffee outlet in the coffee machine Moreover, an electronic control unit 18, lines, not explained in more detail, and plug connections on the rear, which cannot be seen, are provided in this milk module 2.

Figure 3:
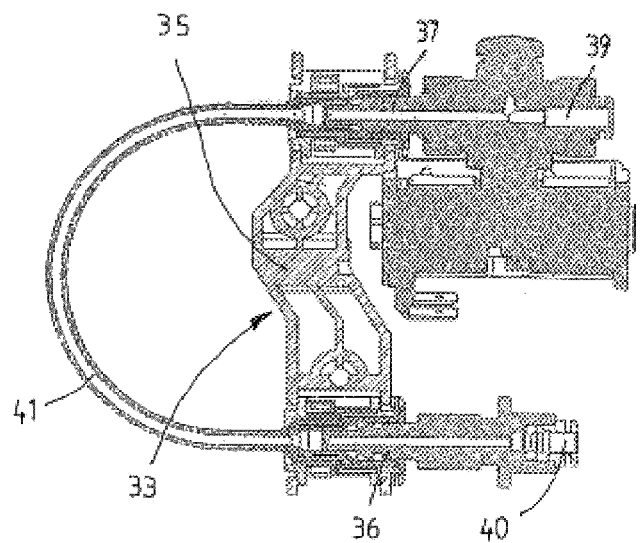
FIG. 3 is a section of the socket attachment on the top side of the milk module.

According to FIG. 3, the connection means is formed advantageously as a socket attachment 33 with two sliding socket joints 36, 37 arranged preferably axially parallel to one another, into which the input or output line 39, 40 can be inserted in sealing manner and optimized for dead space. The one sliding socket joint 36, 37 is arranged projecting to a rack 2' surrounding the cool box 4, to which rack the output line 40 can be coupled into the coffee machine 1.

The socket attachment 33 has a connecting piece 35 which is provided with a sliding socket joint 36 or 37 at each of its ends, wherein the connecting piece 35 is fixed into the housing 3. These sliding socket joints are preferably connected to a manifold 41 on the rear.

Once the milk module has been installed into the housing 3, it is required merely to couple the output line 40 with the sliding socket joint 36. The socket attachment 33 is characterized by very simple design and safe handling. Self-evidently, however, other types of coupling may come into question for this purpose.

Figure 4:
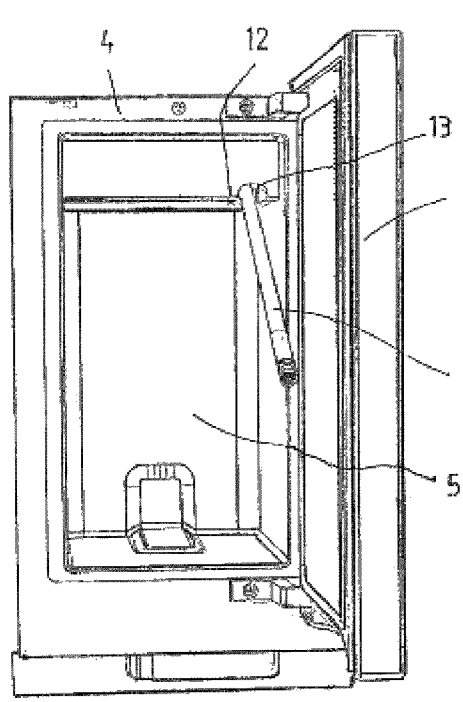
FIG. 4 is the cool box of the milk module according to FIG. 2 before inserting a container.
Figure 5:
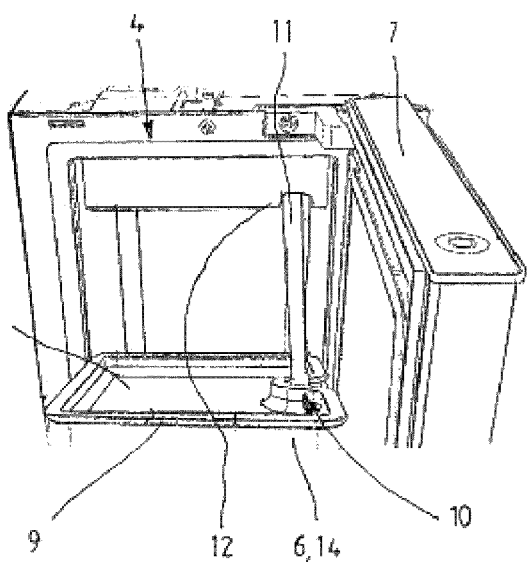
FIG. 5 is the cool box of the milk module according to FIG. 2 when inserting the milk container.

FIG. 4 and FIG. 5 show a suction hose 11 according to the invention which can be housed pivotable forwards or backwards in the upper region of the cool box 4, and is aligned hanging freely downwards.

The suction hose 11 is held rotatable by a swivel drive 12 which can be housed preferably in the upper region of the cool box 4 and actuated preferably manually. For this, in a joint 13 of the swivel drive 12, a detent position is provided through which, after removing the milk container 6 from the cooling chamber 5, the suction hose 11 projects, locked. In this forward-pivoted position 11', the suction hose can be inserted from above into the milk container 6 or into a cleaning container 14 when being inserted into the cooling chamber 5. In so doing, this suction hose is integrated into the cooling chamber 5 in space-saving manner.

When reinserting the milk container, the suction hose 11 is introduced through the opening 10 of the milk container 4 contactlessly. Once the milk container has been inserted into the cool box 4, the suction hose is again directed downwards, in order that it extends with its bottom end approximately as far as the bottom of the respective container. The milk container 6 can furthermore be sealed by a cover 8.

The milk container 6 can be exchanged, within the scope of the invention, for a cleaning container 14. The additional installation space required otherwise for the cleaning container or the like can be dispensed with as a result, and thus a reduced dimensioning of the coffee machine is made possible.

Figure 6:
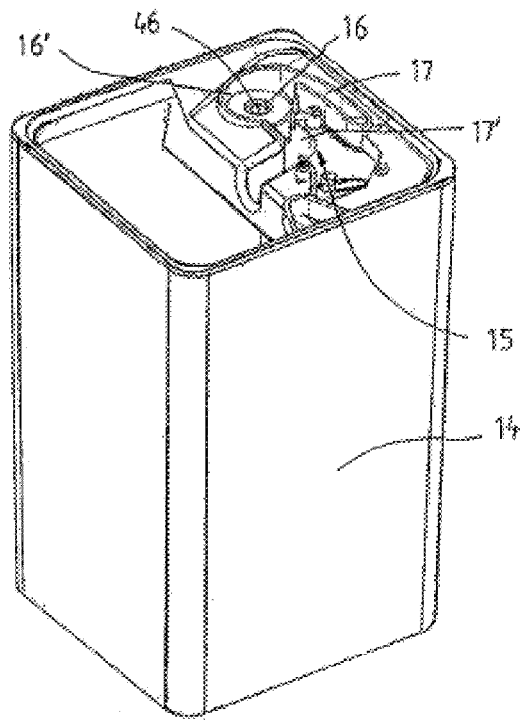
FIG. 6 is a perspective view of a cleaning container for the milk module according to FIG. 2.

FIG. 6 shows a cleaning container 14, particularly suitable for this purpose, which is advantageously dimensioned with the same shape or overall dimensions as the milk container 6. In contrast thereto, however, this cleaning container contains a device 15 with a water supply channel 17, a defined opening 16' for receiving a cleaning agent and an outlet opening 17'.

Expediently, the water supply channel 17 arranged in the upper part of the container is guided tangentially into this cylindrical opening 16' accessible from above, in which at least one cleaning tablet 16 can be positioned as soluble cleaning agent. Preferably, it is designed annular and provided with a central bore, with the result that it can be positioned approximately play-free and detected by the central pin 46 in the opening 16'.

To dissolve the tablets, water is supplied tangentially onto the tablets 16 from the cool box 4 into the water supply channel 17, and the water runs out through the outlet opening 17 with the dissolved tablet, collecting in the cleaning container 14 and is guided from there into the milk module by the suction hose 11 inserted into the cleaning container.

Figure 7:
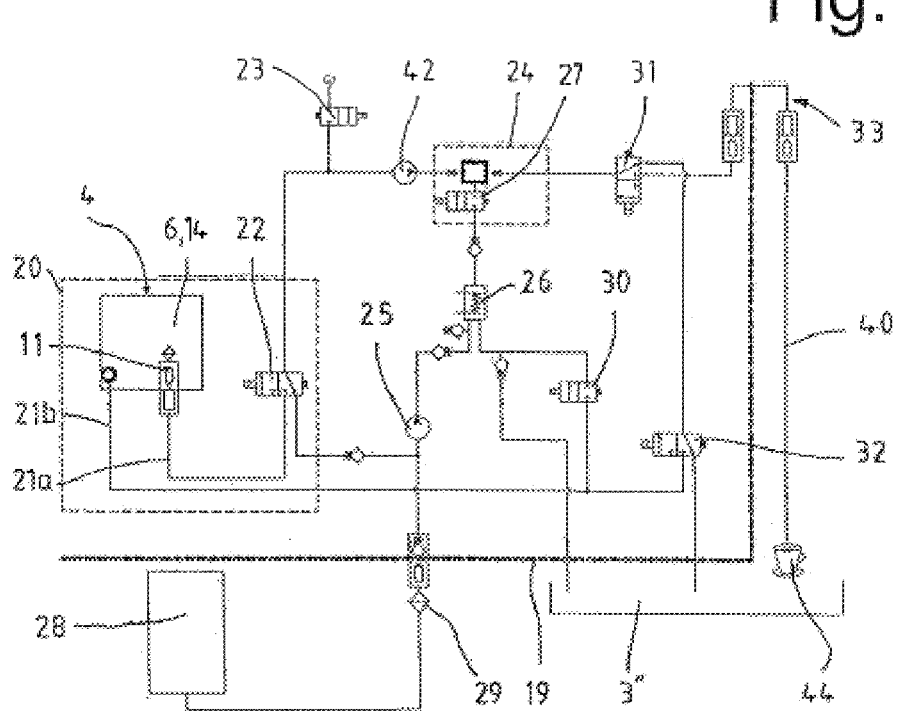
FIG. 7 is a schematic of the hydraulic circuit of the milk module according to FIG. 2.

FIG. 7 shows, schematically, the working circuit of the milk module 2 which is delimited by the dashed lines 19. In this, the cool box 4 is shown with the milk container 6 or the cleaning container 14 with dashed lines 20. For supplying milk, the suction hose 11 is connected to a heating chamber of the device 24 via a line 21a, a two-way valve 22, an air-suction valve 23 as well as a conveyor pump 42, wherein the device can also be connected to the boiler 26 and an added valve 27 for supplying steam. Via a filter 29, an external water tank 28 can be connected to the boiler 26 via a water pump 25.

The cleaning container 14 is inserted into the cooling chamber 5 for the periodic cleaning procedure of the milk module 2. In this, the suction hose 11 is connected to a line 21b with the two-way valves 30 or 32. In so doing, the heating chamber of the device 24 and the conveyor pump 42 can be flushed with the respective lines.

Furthermore, there are also shown the socket attachment 33 and the output line 40 which lead to a cup 44 or the like on the drip pan 3" for pouring in milk or milk foam.

The invention is displayed sufficiently using the above explained embodiment example. However, self-evidently it can also be disclosed using other variants. In this way, the connection means for routing the heated milk or the generated milk foam from the milk module to the outlet in the coffee machine can be provided other than by a socket attachment, such as for example by a hose connection. In principle, an output line 40 can be provided on each side of the milk module, each for a coffee machine module.

The invention claimed is:

1. A milk module for generating milk foam or milk beverages, comprising:
   a housing;
   a cool box in said housing defining a cooling chamber;
   a suction hose pivotally mounted in an interior of said cool box such that said suction hose is insertable in a forward-pivoted position into a milk container when being inserted into said cooling chamber in said cool box or into a cleaning container when being inserted into said cooling chamber in said cool box;
   a swivel drive that rotates said suction hose, said swivel drive being provided on its joint with a detent position in which said suction hose projects from said cooling chamber and is locked in one position;
   a conveyor pump that conveys milk from the milk container when present in said cooling chamber in said cool box through said suction hose or cleaning agent from the cleaning container when present in said cooling chamber in said cool box through said suction hose to enable a cleaning process; and
   a device for heating milk when conveyed by said conveyor pump or for generating the milk foam or milk beverages when conveyed by said conveyor pump.

2. The milk module according to claim 1, wherein, when inserting the milk container or the cleaning container into said cooling chamber in said cool box, said suction hose is configured to pivot due to said swivel drive until it is directed downwards.

3. A cleaning container for the milk module according to claim 1, comprising
a device with a water supply channel, a defined opening for receiving a cleaning tablet, and an outlet opening by means of which water is guided through said water supply channel into said defined opening and into which the cleaning tablet is dissolved and flows into the cleaning container, emulsified with the water, via said outlet opening.

4. The cleaning container according to claim 3, wherein said water supply channel is guided tangentially into said defined opening which is a cylindrical opening.

5. The cleaning container according to claim 4, wherein said defined opening is a cylindrical opening in which the cleaning tablet is positionable and detectable as a soluble cleaning agent.

6. A coffee machine including the milk module according to claim 1 installed therein.

7. The coffee machine according to claim 6, further comprising connection means coupled to said device for connecting said device to an outlet of the coffee machine to enable flow of milk heated by said device when being conveyed by said conveyor pump or milk foam or milk beverages generated by said device when being conveyed by said conveyor pump to the outlet.

8. The coffee machine according to claim 7, wherein said connection means comprise an input line and an output line.

9. The milk module according to claim 1, further comprising a cleaning system integrated into the milk module as an independent unit and which functions to provide the cleaning process when the cleaning container is present in said cooling chamber in said cool box.

10. The milk module according to claim 1, further comprising a cleaning system in said housing and which functions to provide the cleaning process when the cleaning container is present in said cooling chamber in said cool box.

11. The milk module according to claim 1, wherein said suction hose is pivotable forward and backward.

12. The milk module according to claim 1, wherein said suction hose is configured to hang freely downward from an upper region of said cool box.

13. The milk module according to claim 1, wherein said suction hose is configured to be insertable into the milk container when present in said cooling chamber in said cool box without contact with the milk container or into the cleaning container when present in said cooling chamber in said cool box without contact with the cleaning container.

14. The milk module according to claim 1, wherein said suction hose is configured to be insertable in the forward-pivoted position from a top of said cool box into the milk container when the milk container is being inserted into said cooling chamber in said cool box or into the cleaning container when the cleaning container is being inserted into said cooling chamber in said cool box.

15. The milk module according to claim 1, wherein said swivel drive is housed in a region of said cool box.

16. The milk module according to claim 1, wherein said swivel drive is manually actuated.

17. The milk module according to claim 1, wherein said suction hose projects from said cooling chamber and is locked in position upon removal of the milk container or the cleaning container forward out of said cooling chamber in said cool box.

18. The milk module according to claim 2, wherein said suction hose has a bottom end and is configured such that, when inserting the milk container or the cleaning container into said cooling chamber in said cool box, said suction hose pivots due to said swivel drive until it is directed downward and said bottom end of said suction hose extends as far as a bottom of the milk container or the cleaning container.

19. An apparatus for cleaning a milk module that generates milk foam or milk beverages and has a housing, a cool box in the housing defining a cooling chamber in which a milk container is inserted, a conveyor pump that conveys milk from the milk container when present in the cooling chamber in the cool box, and a device for heating the milk when being conveyed by the conveyor pump or for generating the milk foam or milk beverages when being conveyed by the conveyor pump, the apparatus comprising:
a cleaning container configured to be insertable into the cooling chamber in the cool box and removable from the cooling chamber in the cool box, the conveyor pump being configured to convey cleaning agent from said cleaning container when present in the cooling chamber in the cool box to enable a cleaning process of the milk module,
said cleaning container comprising:
a defined opening for receiving a dissolvable cleaning tablet,
a water supply channel through which water is supplied to said defined opening, said water supply channel being guided tangentially into said defined opening, and
an outlet opening in flow communication with said defined opening,
whereby when water is supplied through said water supply channel into said defined opening while the cleaning tablet is received therein, the cleaning tablet is dissolved and the solution flows via said outlet opening into the cleaning container to constitute the cleaning agent.

20. The apparatus according to claim 19, wherein said cleaning container has the same shape and overall dimensions as the milk container, said water supply channel is arranged in an upper part of said cleaning container and said defined opening is a cylindrical opening, the apparatus further comprising:
a suction hose pivotally mounted in an interior of the cool box such that the suction hose is insertable in a forward-pivoted position into the milk container when being inserted into the cooling chamber in the cool box or into said cleaning container when being inserted into the cooling chamber in the cool box, the conveyor pump being configured to convey the cleaning agent from said cleaning container when present in the cooling chamber in the cool box through said suction hose to enable the cleaning process.

* * * * *